US007099948B2

(12) United States Patent
Tormasov et al.

(10) Patent No.: US 7,099,948 B2
(45) Date of Patent: Aug. 29, 2006

(54) VIRTUAL COMPUTING ENVIRONMENT

(75) Inventors: Alexander Tormasov, South San Francisco, CA (US); Dennis Lunev, South San Francisco, CA (US); Sergei Beloussov, Singapore (SG); Stanislav Protassov, Singapore (SG); Yuri Pudgorodsky, South San Francisco, CA (US)

(73) Assignee: SWsoft Holdings, Ltd., Tortola (VG)

( * ) Notice: Subject to any disclaimer, the term of this patent is extended or adjusted under 35 U.S.C. 154(b) by 811 days.

(21) Appl. No.: 09/918,031

(22) Filed: Jul. 30, 2001

(65) Prior Publication Data
US 2002/0124072 A1 Sep. 5, 2002

Related U.S. Application Data

(60) Provisional application No. 60/269,655, filed on Feb. 16, 2001.

(51) Int. Cl.
*G06F 15/177* (2006.01)

(52) U.S. Cl. ............... 709/229; 709/223; 709/228; 707/10; 707/146

(58) Field of Classification Search ............... 709/229, 709/228, 223, 204
See application file for complete search history.

(56) References Cited

U.S. PATENT DOCUMENTS

| 4,742,477 A | 5/1988 | Phillips et al. ............ 364/708 |
| 5,961,582 A | 10/1999 | Gaines |
| 6,026,474 A | 2/2000 | Carter et al. |
| 6,173,374 B1 | 1/2001 | Heil et al. |
| 6,438,705 B1 | 8/2002 | Chao et al. |
| 6,701,437 B1 | 3/2004 | Hoke et al. |
| 6,779,016 B1 * | 8/2004 | Aziz et al. .................. 709/201 |
| 6,823,462 B1 | 11/2004 | Cheng et al. |
| 2002/0049803 A1 * | 4/2002 | Bandhole et al. ........... 709/104 |
| 2002/0055989 A1 | 5/2002 | Stringer-Calvert et al. |
| 2002/0091697 A1 * | 7/2002 | Huang et al. ............... 707/10 |
| 2002/0095496 A1 | 7/2002 | Antes et al. |
| 2002/0143960 A1 | 10/2002 | Goren et al. |
| 2002/0147815 A1 | 10/2002 | Tormasov et al. |
| 2002/0188657 A1 | 12/2002 | Traversat et al. |
| 2003/0037134 A1 | 2/2003 | Hickman |

OTHER PUBLICATIONS

Bach, Maurice J. *Design of the Unix Operating System*, 1st edition (Feb. 27, 1987) Prentice Hall; ISBN: 0132017997.
Crowley, Charles. *Operating Systems: a design-oriented approach*. Irwin. 1997. ISBN 0-256-15151-2.
Eckel, George and Chris Hare. *Building a Linux Internet Server*, New Riders Publishing; 1995. ISBN: 1562055259.
Eckel, George. Ch. 1, pp. 10-13, 46-47. *Building a UNIX Internet Server*, New Riders Publishing, 1995. ASIN: 1562054945.
Kobert, Jeannie Johnstone. *Guide to High Availability: Configuring boot/root/swap*, Prentice Hall PTR/Sun Microsystems Press; ISBN: 0130163066.

(Continued)

*Primary Examiner*—Jason Cardone
*Assistant Examiner*—Adnan M. Mirza

(57) ABSTRACT

Method of efficient utilization of a single hardware system with single operating system kernel wherein a virtual environment, functionally equivalent to a full-featured operating system box, is provided to an end user without emulation of hardware, dedicated physical memory or another hardware resource. Such method is realized by separation of user processes on the level of namespace and on the basis of restrictions implemented inside the operating system kernel. Each virtual environment is invisible to other virtual environments within the system and has a completely independent root file system.

8 Claims, 3 Drawing Sheets

OTHER PUBLICATIONS

*Sun Enterprise™ 10000 Servier: Dynamic System Domains, Technical White Paper* (Feb. 1999) Sun Microsystems, Inc.

Samson, Stephen L. *MVS Performance Management Os/390 Edition: With Mvs/Esa Sp Version 5*. Ranade IBM Series, ASIN: 0070577005.

*z/VM™ built on IBM Virtualization Technology: General Information*, Version 4, Release 2.0, 3$^{rd}$ Ed. (Oct. 2001), International Business Machines Corporation; GC24-5991-02.

*The Common Gateway Interface,* document downloaded from Internet http://hoohoo.ncsa.uiuc.edu/cgi/overview.html.

*VMware Workstation 2.0 Documentation,* document downloaded from Internet http://www.vmware.com/support/ws2/doc/index_ws_linux.html.

*VMware Workstation 3.0 Increased Productivity for Technical Professionals.* www.vmware.com, VMware, Inc.; Item No. V00005-2001105.

\* cited by examiner

VIRTUAL COMPUTING ENVIRONMENT

REFERENCE TO RELATED APPLICATIONS

This application claims the benefit of U.S. Provisional Application for Pat. No. 60/269,655 titled "*Use of Virtual Computing Environments to Provide Full Independent Operating System Services on a Single Hardware Node*" filed on Feb. 16, 2001 for priority under 35 U.S.C. §119(e), is related thereto, is commonly assigned therewith, and incorporates herein by reference in its entirety the subject matter thereof.

BACKGROUND OF THE INVENTION

1. Technical Field

This invention relates to the provision of full independent computer system services across a network of remote computer connections.

2. Description of the Prior Art

The problem of providing computer services across remote computer connections has existed during the last 30–40 years beginning with the early stages of computer technologies. In the very beginning, during the mainframe computer age, this problem was solved by renting computer terminals which were associated with a mainframe computer and then connecting the related computer terminals to the mainframe computer using a modem or dedicated lines to provide the mainframe computer with data access services (U.S. Pat. No. 4,742,477, Bach 1987). Later, with the beginning of the age of personal computers and with the widespread acceptance of the client-server model (Crowley 1997), the problem of access to large information sources in the form of computer readable data, at first look, seems to have been solved. Specifically, every user could have his own computer and then rent an Internet connection to obtain access to information sources or data stored on other computers.

Today, with wide growth of Internet access, another problem has arisen—the problem of information creation. Usually, users want to put out their own information sources in the form of websites and then provide other computer users with access to these websites. However, it is not possible to install a web server on most home connections to a personal computer, simply because the connection to the network from a home computer is usually not adequate to handle the amount of data transfer required. Accordingly, this need has given birth to an industry called a "hosting service"—a hosting service provides computer users with an ability to utilize installed web services (Eckel 1995).

When one wants to provide Internet users with information in the form of computer readable data (usually in web server form) which could be of interest to a wide range of Internet users, one must store the information and provide a reliable network connection to access the information when needed.

The problem of providing ordinary personal computer users access to information on large capacity computers occurred virtually from the beginning of personal computer production. During the era of the mainframe computer, when direct user access to computer equipment was difficult, this problem was solved by providing users with remote terminals directly connected to a single mainframe computer (U.S. Pat. No. 4,742,477, Bach 1987). These remote terminals were used to obtain certain services from mainframe computers. The advantage of using multiple remote terminals with a single mainframe computer was that the user had little trouble accessing both the mainframe computer hardware and, to some extent, the software resident on the mainframe computer. This is because mainframe computer administration has always dealt with installing and updating software.

Later, with the introduction of personal computers, each personal computer user could gain access to computing power directly from his workplace or home. With the advent of Internet access, the needs of most users for large amounts of information and robust operating systems were met.

The client-server model of networking computers (Crowley 1997) provides a system for accessing computer readable data in which a personal computer is designated as the client computer and another computer or a set of computers is designated as the server computer. Access to the server computer is carried out in a remote way covering the majority of needs of the common computer users.

But even the client-server model has some very fundamental drawbacks. Specifically, the high price of servicing many client workplace computers, including the creation of a network infrastructure and the installation and upgrading of software and hardware to obtain bandwidth for client computer network access, is a significant drawback. Additionally, the rapid growth of information on the Internet has produced more users who in turn continue to fill the Internet with more information. The required service to client computers should be provided by a sufficiently powerful server computer (usually a web or www server) which has an access channel to the Internet with corresponding power. Usually, personal computers have enough performance capability to interact with most of the web servers, but the typical network access is usually less productive than what is required. Additionally, most home personal computers cannot provide sufficient reliability and security. Apart from Internet services, the same problems occur when ordinary personal computer users utilize very complex software packages. Users spend a lot of time and effort setting up and administering these complex software packages. To solve these web service problems, a remote web host (usually supported by an ISP, i.e., Internet Service Provider) usually hosts the web servers for the personal computer users. Thus, the personal computer user is restricted to use of the standard preinstalled web server of the ISP. As a result, the personal computer user's options are limited.

Problems usually arise with the use of CGI (The Common Gateway Interface) scripts and more complex applications requiring a data base. Such computer tools cannot be used to access any of the personal computer user's programs on a remote server. The personal computer user is used to the absolute freedom of adjustment of his local machine, and therefore the limitations that are imposed by the administration of a remote node on a data storage network are often unacceptable.

One solution to these problems is the use of computer emulators. The OS/390 operating system for IBM mainframe computers has been in use for many years (Samson). The same products with hardware partitioning are produced by another vendor of computers—Sun Microelectronics (Kobert). Each personal computer user is given a fully-functional virtual computer with emulated hardware. This approach is very costly because the operating system installed in the corresponding virtual computer does not recognize the existence of the neighboring analogous computers and shares practically no resources with those computers. Experience has shown that the price associated with virtual computers is very great.

Another analogous solution for non-mainframe computers utilizes software emulators of the VMware type (VMWare Workstation 2.0 Documentation). These software programs exist for different types of operating systems and wholly emulate a typical computer inside one process of a main computer operating system.

The main problem is the limitation on the number of computer emulators that can be used on a typically configured server. This limitation is usually due to the fact that the size of the emulated memory is close to the size of the memory used by the process or in which the computer emulator works. That is, the number of computer emulators that can be simultaneously used on one server ranges from about 2–3 to about 10–15. All of the above-mentioned solutions can be classified as multikernel implementations of virtual computers; i.e., the simultaneous existence on one physical computer of several operating system kernels that are unaware of each other.

Therefore, when it is necessary for many personal computer users to deal with a hosting computer, each personal computer user must be provided with a complete set of services that the personal computer user can expect from the host; i.e., a complete virtual environment which emulates a complete computer with installed operating system. For an effective use of equipment, the number of computers in a virtual environment installed in one host computer should be at least two to three times larger than the numbers mentioned above.

BRIEF SUMMARY OF THE INVENTION

The present invention describes a method of efficient utilization of a single hardware system with a single operating system kernel. The end user of a personal computer connected to a server system is provided with a virtual computing environment that is functionally equivalent to a computer with a full-featured operating system. There is no emulation of hardware or dedicated physical memory or any other hardware resources as is the case in a full hardware emulation-type solution.

The system and method of the present invention is implemented by the separation of user processes on the level of kernel objects/resources namespace and on the basis of access restrictions enforces inside the operating system kernel. As defined in (Crowley 1997), namespace is a collection of unique names, where name is an arbitrary identifier, usually an integer or a character string. Usually the term "name" is applied to such objects as files, directories, devices, computers, etc. Virtual computing environment processes are never visible to other virtual computing environments running on the same computer. A virtual computing environment root file system is also never visible to other virtual computing environments running on the same computer. The root file system of a virtual computing environment allows the root user of every virtual computing environment to perform file modifications and local operating system parameters configuration.

BRIEF DESCRIPTION OF THE DRAWING FIGURES

A better understanding of the present invention may be had by reference to the drawing figures, wherein.

DETAILED DESCRIPTION OF THE INVENTION

The disclosed invention presents a method for efficient utilization of a single hardware system with a single operating system kernel. The utilization of the disclosed system and method is perceived by the personal computer user as if he has obtained full network root access to a common computer with a fully-featured operating system installed on it. Specifically, the end user of a personal computer is provided with a virtual computing environment that is functionally equivalent to a computer with full-featured operating system.

Figure 1:
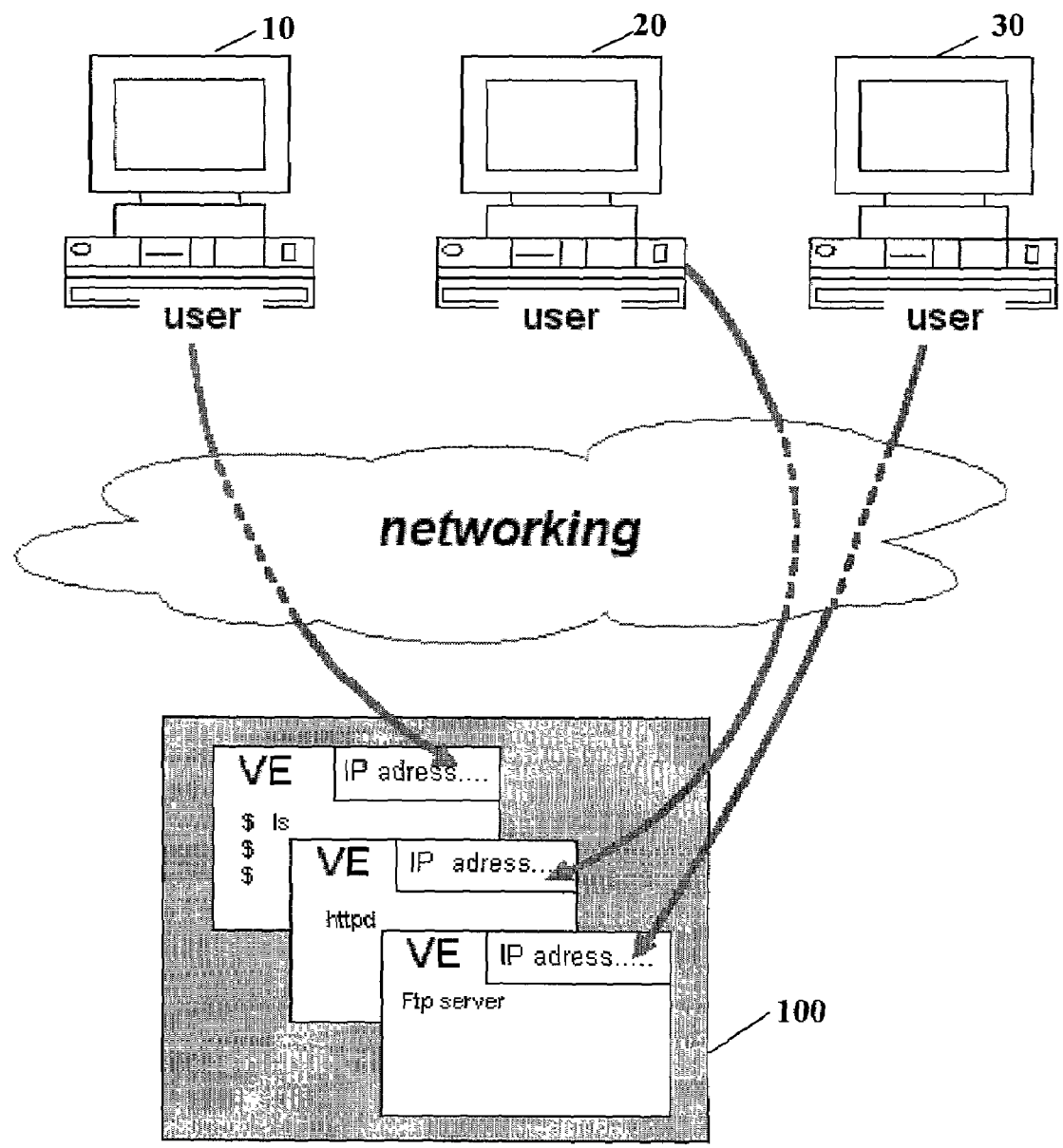
FIG. 1 shows a network of end users with access to virtual computing environments encapsulated in a computer with a full feature operating system in accordance with the present invention.

From the point of view of the end user of a personal computer, each virtual computing environment is the actual remote computer with the network address in which the end user can perform all actions allowed for the ordinary computer: the work in command shells, compilation and installation of programs, configuration of network services, work with offices and other applications. As shown in FIG. 1, several different users 10, 20, 30 of personal computers can work with the same hardware node 100 without noticing each other, just as if they worked on totally separate computers with no associated hardware.

Each virtual computing environment includes a complete set of processes and files of an operating system that can be modified by the end user. In addition, each end user 10, 20, 30 may stop and start the virtual computing environment in the same manner as with a common operating system. However, all of the virtual computing environments share the same kernel of the operating system. All the processes inside the virtual computing environment are the common processes of the operating system and all the resources inherent to each virtual computing environment are shared in the same way as typically happens inside an ordinary single kernel operating system.

Figure 2:
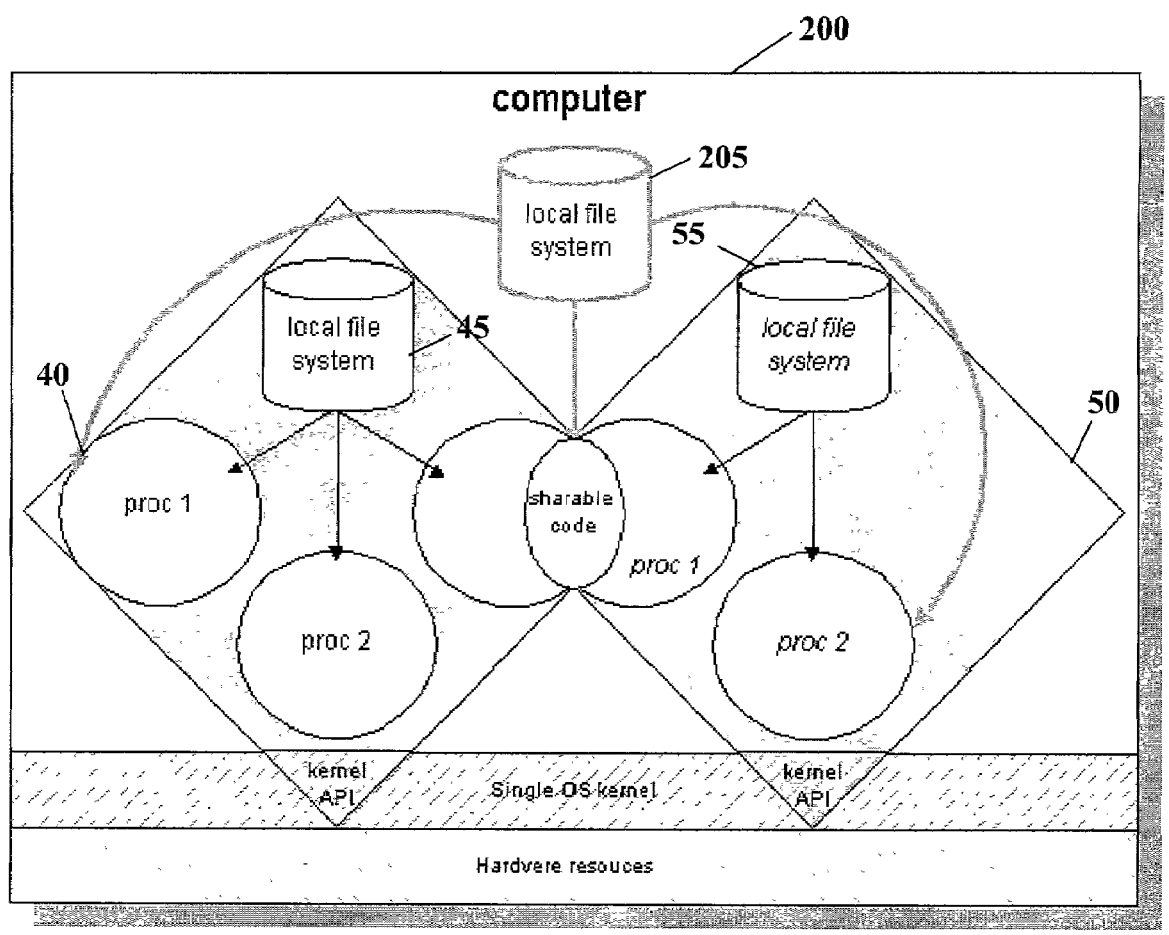
FIG. 2 shows a utilization of resources of hardware (memory and file system) by different virtual computing environments.

FIG. 2 shows the method enabling the coexistence of the two virtual computing environments 40, 50 on one hardware computer 200. Each of the two virtual computing environments 40, 50 has its own unique file system 45, 55 and each virtual environment can also see the common file system 205. All the processes of all virtual computing environments work from inside the same physical memory. If two processes in different virtual computing environments were started for execution from one file (for example from the shared file system) they would be completely isolated from each other, but use the same set of read-only shared physical memory pages.

In this manner, highly effective implementation of multiple virtual computing environments inside one operating system is achieved. There is no emulation of hardware or dedicated physical memory or another hardware resource.

Figure 3:
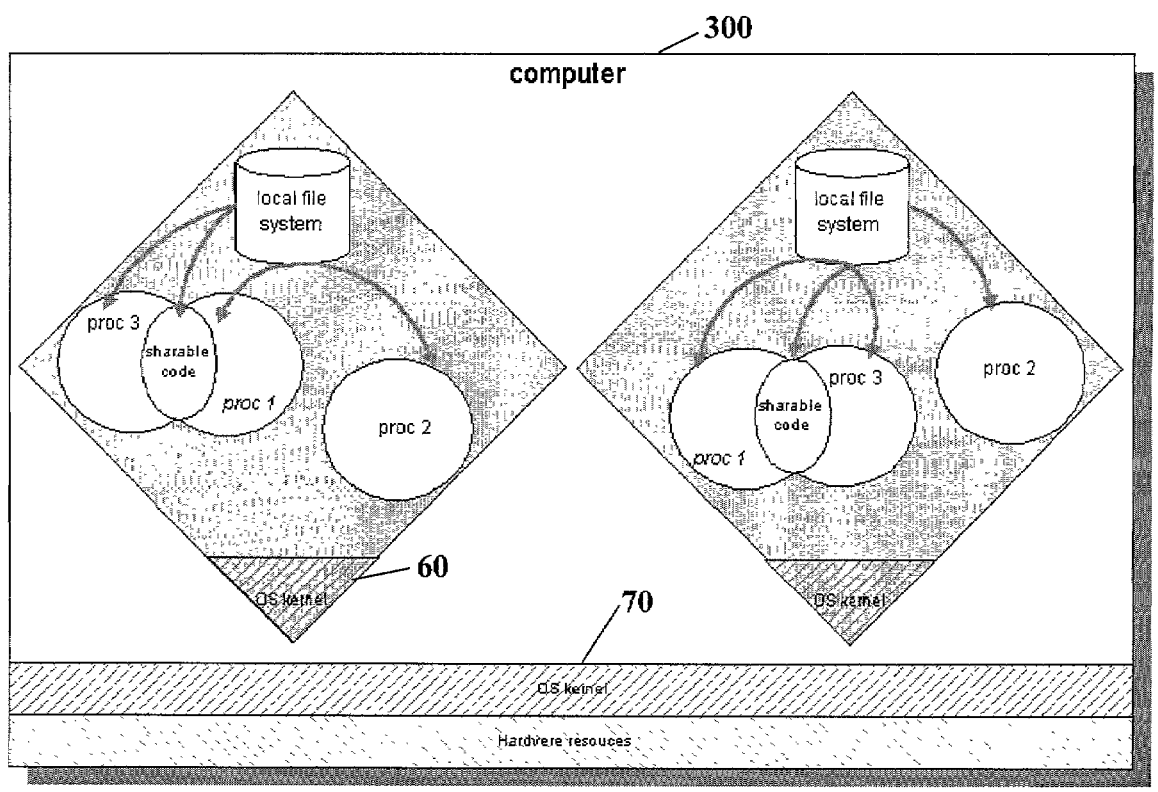
FIG. 3 shows a utilization of resources of hardware (memory and file system) in another full hardware emulation solution.

As shown in FIG. 3, the disclosed invention differs from the other solutions that provide a complete emulation of computer hardware to give the user a full scope virtual computer at a higher cost. This happens because a minimum of 2 actual kernels 60, 70 are performed in the computer 300, one inside the other—the kernel of the main operating system and inside the process, the kernel of the emulated operating system.

The implementation of the kernels of the operating system with the properties necessary for this invention carry out the separation of the personal computer users not on the level of hardware but on the level of the namespace and on the basis of access limitations implemented inside the kernels of the operating system.

Virtual computing environment processes are never visible to other virtual computing environments running on the same computer. The virtual computing environment root file system is independent and is also never visible to other virtual computing environments running on the same computer. The root file system of the virtual computing environment allows a root user of every virtual computing environment to make file modifications and configure their own local parameters of the operating system.

The changes done in the file system in one virtual computing environment do not influence the file systems in the other virtual computing environment.

The disclosed system and method has been disclosed by reference to its preferred embodiment. Those of ordinary skill in the art will understand that additional embodiments of the disclosed system and method are made possible by the foregoing disclosure. Such additional embodiments shall fall within the scope and meaning of the appended claims.

What is claimed is:

1. A computing system comprising:
    a physical server having a single operating system Kernel;
    a plurality of isolated virtual computing environments running on the physical server, each virtual computing environment being functionally equivalent to a physical server,
    wherein the virtual computing environments do not require emulation of hardware resources and do not require dedicated memory;
    each virtual computing environment having plurality of objects associated with it and supported by the Kernel, with each object having a corresponding identifier,
    wherein at least some of the identifiers are the same for objects associated with different virtual computing environments, and
    wherein at least some objects are simultaneously associated with multiple virtual computing environments;
    wherein objects of different virtual computing environments are isolated from each other even when they have the same identifiers; and
    wherein the Kernel restricts access to objects using identifiers of one virtual computing environment from another virtual computing environment.

2. The system of claim 1 wherein each virtual computing environment has an independent root file system.

3. The system of claim 1, wherein resources and objects of one virtual computing environment are not visible to processes and objects of other virtual computing environments.

4. The system of claim 1, wherein the virtual computing environment comprises processes and files of the operating system kernel.

5. A method of operating a computing system comprising:
    starting a physical server having a single operating system kernel; and
    initiating a plurality of isolated virtual computing environments on the physical server, each virtual computing environment being functionally equivalent to a physical server, each virtual computing environment having a plurality of objects associated with it and supported by the kernel, with each object having a corresponding identifier,
    wherein at least some of the identifiers are the same for objects associated with different virtual computing environments,
    wherein at least some objects are simultaneously associated with multiple virtual computing environments,
    wherein objects of different virtual computing environments are isolated from each other even when they have the same identifiers;
    wherein the virtual computing environments do not require emulation of hardware resources and do not require dedicating memory, and
    wherein the kernel restricts access to objects of one virtual computing environment from another virtual environment when the same identifier is used for access.

6. The method of claim 5, wherein each virtual computing environment has an independent root file system.

7. The method of claim 5, wherein resources and objects of one virtual computing environment are not visible to processes and objects of other virtual computing environment.

8. The method of claim 5, wherein the virtual computing environment comprises processes and files of the operating system kernel.

* * * * *